(12) United States Patent
Chang

(10) Patent No.: US 9,115,740 B2
(45) Date of Patent: *Aug. 25, 2015

(54) FIXER FOR HANDHELD, PORTABLE, MOBILE DEVICE

(71) Applicant: Michael Chau-Lun Chang, Taipei (TW)

(72) Inventor: Michael Chau-Lun Chang, Taipei (TW)

( * ) Notice: Subject to any disclaimer, the term of this patent is extended or adjusted under 35 U.S.C. 154(b) by 156 days.

This patent is subject to a terminal disclaimer.

(21) Appl. No.: 13/657,876

(22) Filed: Oct. 23, 2012

(65) Prior Publication Data

US 2014/0110544 A1    Apr. 24, 2014

(51) Int. Cl.
| F16B 2/12 | (2006.01) |
| F16M 11/04 | (2006.01) |
| F16M 11/10 | (2006.01) |
| F16M 11/28 | (2006.01) |
| F16M 13/02 | (2006.01) |

(52) U.S. Cl.
CPC ............. *F16B 2/12* (2013.01); *F16M 11/041* (2013.01); *F16M 11/043* (2013.01); *F16M 11/10* (2013.01); *F16M 11/28* (2013.01); *F16M 13/022* (2013.01)

(58) Field of Classification Search
USPC ............. 248/683, 351, 354.1, 354.3, 230.6, 248/230.5, 230.4, 231.71, 231.61, 231.51, 248/316.1, 316.5, 316.6; 269/3, 6, 95, 71
See application file for complete search history.

(56) References Cited

U.S. PATENT DOCUMENTS

| 2,019,789 | A | * | 11/1935 | Mahannah | 269/71 |
| 7,546,993 | B1 | * | 6/2009 | Walker | 248/218.4 |
| 7,891,618 | B2 | * | 2/2011 | Carnevali | 248/228.6 |
| 8,186,642 | B2 | * | 5/2012 | Weiss-Vons | 248/683 |
| D670,284 | S | * | 11/2012 | Choi | D14/253 |
| 8,469,325 | B2 | * | 6/2013 | Yu | 248/316.1 |
| 2003/0122045 | A1 | * | 7/2003 | Mulford et al. | 248/231.71 |
| 2006/0278785 | A1 | * | 12/2006 | Wiesner et al. | 248/231.71 |

* cited by examiner

Primary Examiner — Alfred J Wujciak

(57) ABSTRACT

A fixer for handheld, portable, mobile devices includes an extension rod that has one end provided with a positioning frame for holding and positioning an external mobile device, and has an opposite end provided with a securing member for attaching and securing the extension rod and the positioning frame onto an external article, wherein the securing member and the external article are fixedly connected by a locking unit so as to suspend the mobile device. The fixer is portable and can be easily and quickly mounted on or dismounted from any nearby handrail, particularly as one typically provided in a public transportation vehicle.

5 Claims, 8 Drawing Sheets

FIXER FOR HANDHELD, PORTABLE, MOBILE DEVICE

BACKGROUND OF THE INVENTION

1. Technical Field

The present invention relates to fixers for handheld, portable, and/or mobile devices, and more particularly, to a fixer that is portable and configured to hold and thereby suspend a mobile electronic device, such as a mobile phone, a portable game player, an electronic book, a GPS device or a tablet computer.

2. Description of Related Art

Recently, handheld, mobile devices such as mobile phones and tablet computers have been popular, and nowadays almost everyone has one. While these mobile devices are relatively compact and light-weight, holding them in hand for a sustained time period is still a significant, accumulative burden to muscle, and this is particularly true for people lacking exercise.

There are some fixers designed for small-size mobile devices, but these fixers commonly fail to provide the advantages desired by users, such as being easy to mount and dismount, being compact and light, and being retractable, thereby being more portable.

The existing fixing tools for mobile devices are mainly using a flexible hose ended with a clamp that is configured to hold the whole tool on a table plate. While such an existing fixing tool is effective in suspending a mobile device over a table, it is structurally weak and tends to deform and come down after a long term of suspension. Also due to its weakness, for operating the mobile device, a user has to first use one hand support the mobile device from its back and then use the other hand to touch the touch screen. Thus causes the existing fixing tools to be unfavorable to mobile device operation.

Moreover, in the existing fixing tool, the clamp can only work well with a planar support. However, when leaving a house and used in a public transportation vehicle, such as a MRT train, a subway or a bus, where there are only vertical mop stick handrails, the fixing tool fails because its clamp cannot engage with the handrails effectively. The above-mentioned problems are for us to solve.

SUMMARY OF THE INVENTION

The present invention provides a portable fixer for holding and thereby suspending a mobile electronic device, such as a mobile phone, a portable game player, an electronic book, a GPS device or a tablet computer. The primary objective of the present invention is to suspend a mobile device with proper overall rigidity, so that a user can operate the suspended mobile device by touching or sliding on its touch screen without displacing the mobile device from where it is positioned. Also, the disclosed fixer is configured to firmly grasp a smooth, vertical rod, so that a user riding a public transportation vehicle can conveniently suspend and use his/her mobile device in the vehicle, wherein the fixer supports the mobile device with proper overall rigidity, so that a user can operate the suspended mobile device by touching or sliding on its touch screen. Thereby, the present invention is helpful to prevent users' muscle fatigue and ache caused by overuse of neck and shoulder muscles.

To achieve the foregoing objective, the present invention provides a fixer for handheld, portable, mobile devices, which comprises:

an extension rod;

a positioning frame, deposited at one end of the extension rod, for holding and positing an external mobile device;

a securing member, deposited at an opposite end of the extension rod, for attaching and securing the extension rod and the positioning frame onto an external article, so as to suspend the mobile device, wherein the external article is a planar or a bar-like article; and a locking unit, deposited on the securing member, for fixing the securing member to the external article;

wherein the extension rod is rigid in a vertical direction or in a horizontal direction, and the securing member is configured to grasp a horizontal or vertical, planar or bar-like article, so that when a user touches and operates the mobile device, the mobile device is strongly positioned over the external article by the extension rod and the locking unit, and is prevented from swinging and displacing.

In addition, another fixer for handheld, portable, mobile devices according to the present invention comprises:

a positioning frame, for holding and positioning an external mobile device;

a securing member, deposited on the positioning frame, for attaching and securing the positioning frame onto an external article, so as to suspend the mobile device, wherein the external article is a planar or bar-like article; and a locking unit, deposited on the securing member, for fixing the securing member to the external article;

wherein, the securing member is configured to grasp a horizontal or vertical, planar or bar-like article, so that when a user touches and operates the mobile device, the mobile device is strongly positioned over the external article by the locking unit and prevented from swinging or displacing.

DETAILED DESCRIPTION OF THE INVENTION

Figure 1:
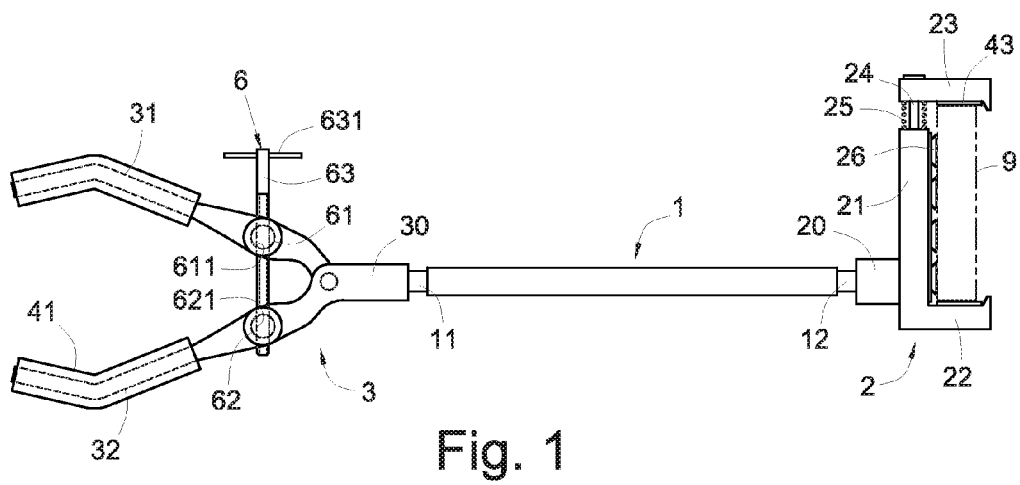
FIG. 1 is a front view of a first embodiment of the present invention.
Figure 2:
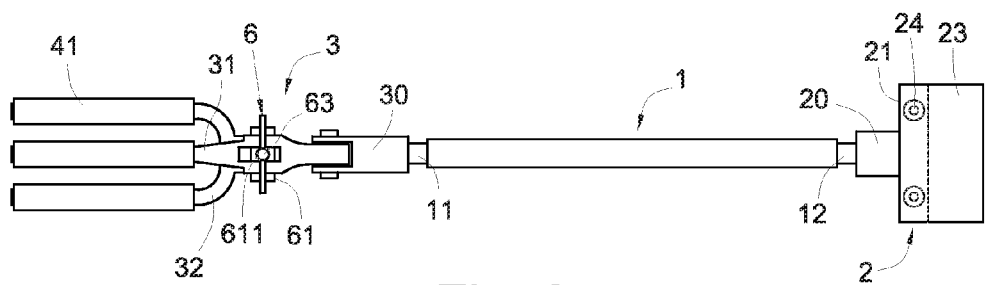
FIG. 2 is a top view of FIG. 1.
Figure 3:
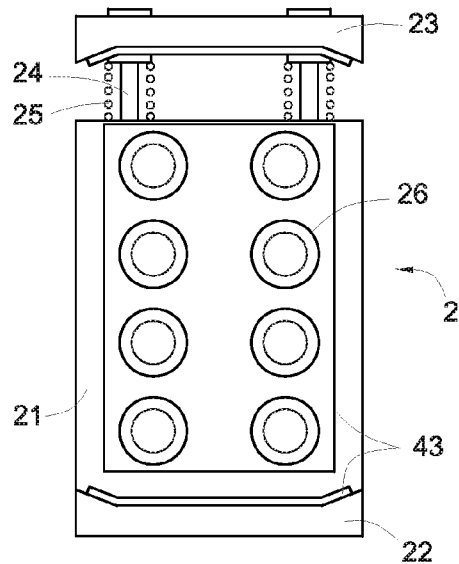
FIG. 3 is a side view of FIG. 1.
Figure 4:
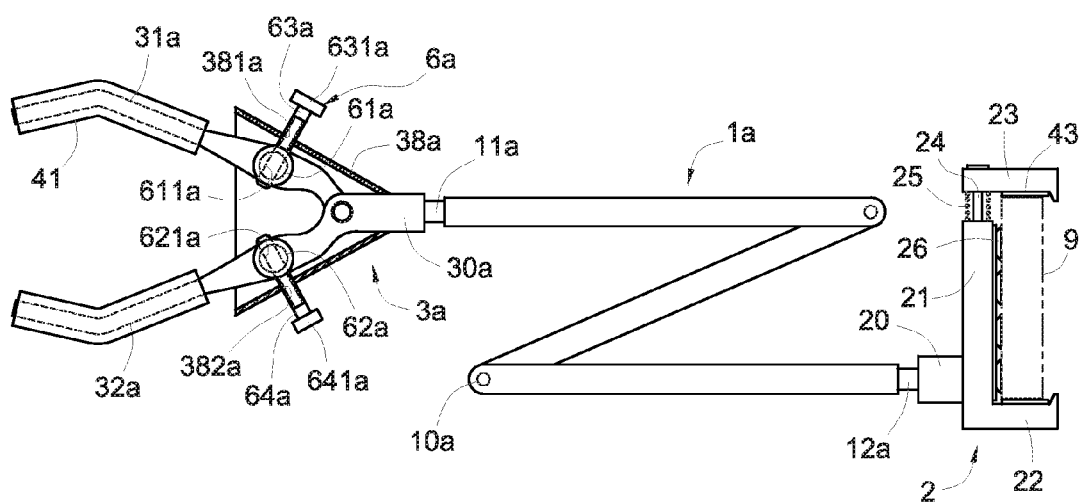
FIG. 4 is a front view of an additional mode of the present invention.
Figure 5:
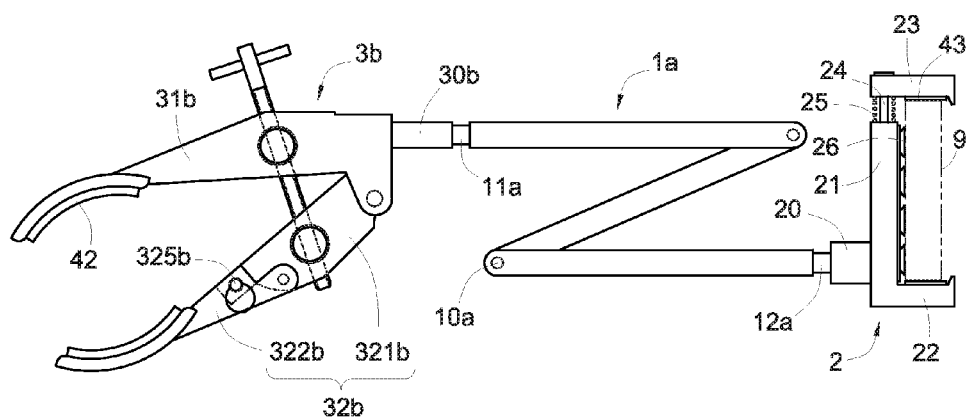
FIG. 5 is a front view of another additional mode of the present invention.
Figure 6:
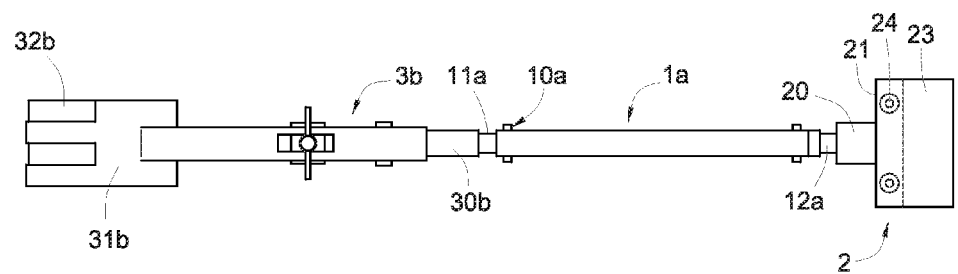
FIG. 6 is a top view of FIG. 5.
Figure 7:
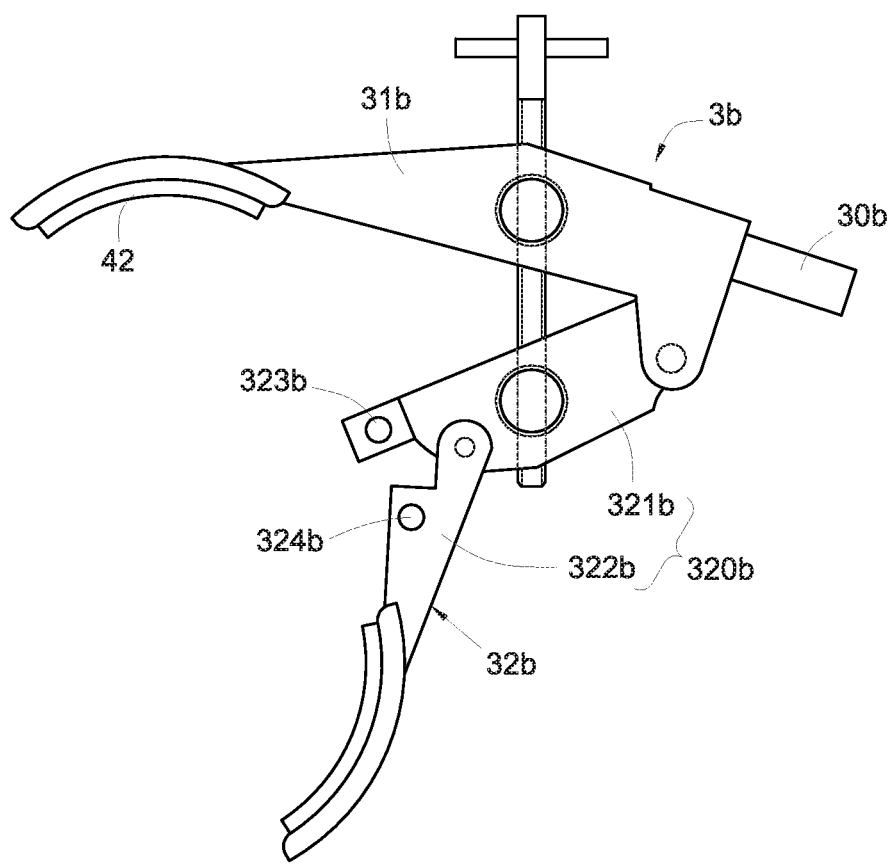
FIG. 7 is a partially enlarged applied view of FIG. 5.
Figure 8:
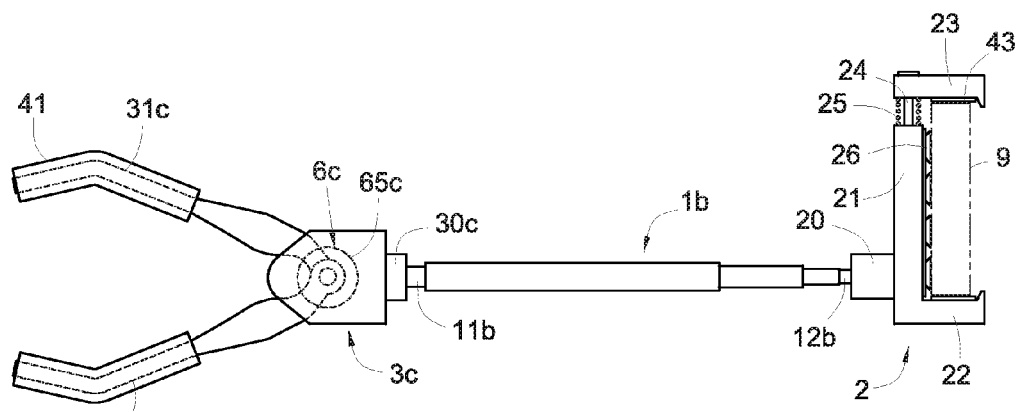
FIG. 8 is a front view of another additional mode of the present invention.
Figure 9:
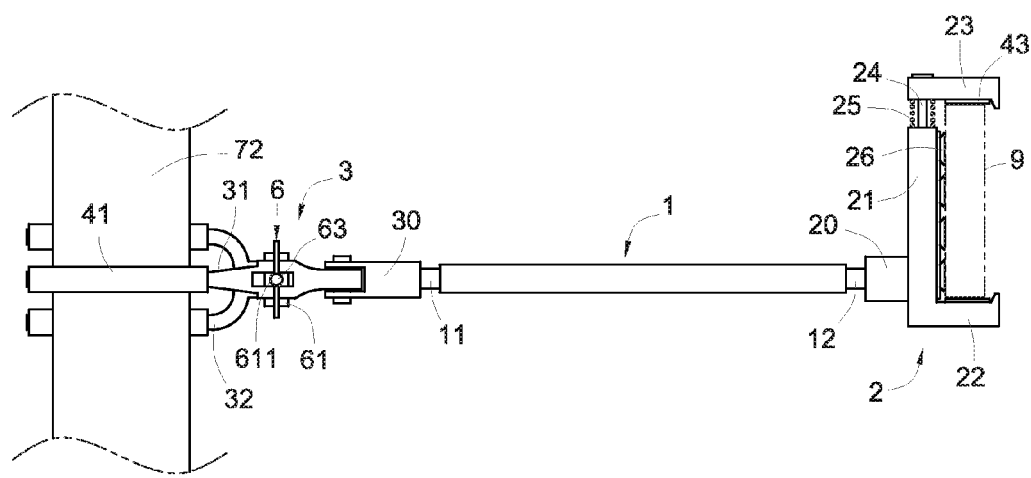
FIG. 9 is an applied view of the present invention.
Figure 10:
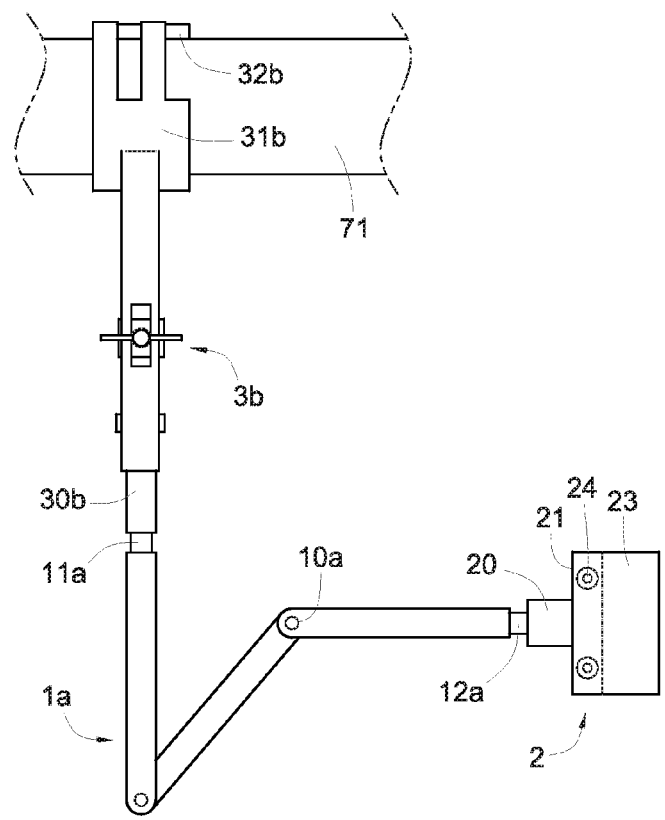
FIG. 10 is another applied view of the present invention.

Referring to FIG. 1 through FIG. 10, what is depicted therein is a first embodiment of the present invention. This fixer for handheld, portable, mobile devices comprises:

an extension rod 1;

a positioning frame 2, provided at one end of the extension rod 1, for holding and positioning an external mobile device 9, wherein the mobile device 9 may be a mobile phone, a portable game player, an electronic book, a GPS device or a tablet computer;

a securing member 3, provided at the other end of the extension rod 1, for attaching and securing the extension rod 1 and the positioning frame 2 onto an external article, thereby suspending the mobile device 9 over the external article that may be a planar or a bar-like article; and a locking unit 6, deposited on the securing member 3, for fixing the securing member 3 to the external article.

The extension rod 1 is rigid in either the vertical direction or the horizontal direction. The securing member 3 is configured to rapidly and firmly grasp the external article no matter it is a horizontal or vertical planar structure, a cylinder or a lengthwise rod, pole or bar-like support, so as to support the mobile device 9 for a user to operate. When operated by the user, the mobile device 9 is strongly positioned over the external article by the extension rod 1 and the locking unit 6, and is prevented from swinging and displacing.

The rod may be a horizontal handrail 71 or a vertical handrail 72 provided in a public transportation vehicle for passengers to hold.

The securing member 3 has at least one movable clamping jaw 31, 32.

The securing member 3 has at least two symmetrical movable clamping jaws 31 and 32. The locking unit 6 comprises pivots 61 and 62 provided on the clamping jaws 31 and 32, respectively. Each of the pivots 61 and 62 is formed with a threaded hole 611 or 621. The locking unit 6 also includes a threaded bolt 63 screwedly connecting the clamping jaws 31 and 32 at end portions of the clamping jaws 31 and 32 adjacent to the opposite end of the extension rod 1 and screwedly passing through the threaded holes 611 and 621 of the pivots 61 and 62 of the clamping jaws 31 and 32. The threaded bolt 63 serves to adjust an included angle between the clamping jaws 31 and 32 unilaterally, so as to form an opening between other end portions of the clamping jaws 31 and 32 thereby allowing the clamping jaws 31 and 32 to hold or release the external article. The threaded bolt 63 has one end provide with an adjusting lever 631 for a user to operate and thereby drive the threaded bolt 63 to rotate.

Alternatively, the securing member 3a has at least two symmetrical movable clamping jaws 31a and 32a and a sheath 38a housing the clamping jaws 31a and 32a at their roots. The locking unit 6a comprises pivots 61a and 62a provided on the clamping jaws 31a and 32a, respectively. Each of the pivots 61a and 62a has a threaded hole 611a or 621a, and the sheath 38a is formed with two threaded holes 381a and 382a aligned with the pivots 61a and 62a, respectively, so that two threaded bolts 63a and 64a can pass through the aligned holes 611a and 621a on the pivots 61a and 62a of the clamping jaws 31a and 32a and the threaded holes 381a and 382a of the sheath 38a, respectively. The threaded bolts 63a and 64a serve to serves to adjust an included angle between the clamping jaws 31a and 32a bilaterally, so as to hold or release the external article. Each of the threaded bolts 63a and 64a has one end provided with an adjusting lever 631a or 641a for a user to operate and thereby drive the threaded bolt 63a or 64a to rotate.

Alternatively, the securing member 3c has at least two symmetrical movable clamping jaws 31c and 32c and the locking unit 6c includes a driver 65c on the securing member 3c for driving the clamping jaws 31c and 32c and thereby adjusting an included angle between the clamping jaws 31c and 32c. The driver 65c may be a motor.

Two or more sets of the two clamping jaws 31/31a/31c and 32/32a/32c may be provided for holding the external article from two or more directions. In addition, each of the clamping jaws 31, 31a, 31b, 31c, 32, 32a, 32b and 32c of the securing member 3, 3a, 3b or 3c may be provided with a cushion 41 or 42 covering its periphery or inner surface, so as to enhance close connection and friction between the clamping jaw 31, 31a, 31b, 32, 32a or 32b and the external article.

The securing member 3, 3a, 3b or 3c is tailed by a first connecting portion 30, 30a, 30b or 30c, and the end of the extension rod 1, 1a or 1b has a first linking portion 11, 11a or 11b for engaging with the first connecting portion 30, 30a, 30b or 30c of the securing member 3, 3a, 3b or 3c. The first connecting portion 30, 30a, 30b or 30c and the first linking portion 11, 11a or 11b are combined by insertion, buckle engagement, embedding, embracing, rotational connection, pivotal connection, suction, magnetism, screwing connection, velcro tapes, adhesive or being formed integratedly.

The clamping jaw 32b has a releasing device 320b. The releasing device 320b includes a root 321b pivotally connected to the securing member 3b, and a tip 322b that is pivotally connected to the root 321b and is far from the securing member 3b. The root 321b and the tip 322b have their connecting surfaces each provided with a positioning hole 323b or 324b. A positioning rod 325b passes through the positioning holes 323b, 324b so as to fix the tip 322b with respect to the root 321b. When there is an urgent need to detach the securing member 3b from the horizontal handrail 71 or the vertical handrail 72 in the public transportation vehicle, the positioning rod 325b of the releasing device 320b can be pulled out to allow the tip 322b to swing outward, so that the securing member 3b can be invalidated by pulling open the releasing device 320b.

The extension rod 1, 1a or 1b may be a unitary member or a composite member. The extension rod 1b is formed by telescoped tubes, so that the extension rod 1b is allowed to have multi-stage extension, thereby increasing an overall using length of the extension rod 1b.

Alternatively, the extension rod 1a is formed by links pivotally linked by one or more movable joints 10a, so that the extension rod 1a is foldable and is allowed to have multi-stage extension, thereby increasing an overall using length of the extension rod 1a. The movable joint 10a is configured to allow the links to move in different angles and thereby include different angles. The movable joint 10a may be a pivot or a universal joint.

The extension rod 1, 1a or 1b is normally retracted in a compact size for portability, and can be extended in length or adjusted in angle to an extent where a user can conveniently view and operate the screen of the mobile device 9.

The positioning frame 2 has a second connecting portion 20 at its back, and the end of the extension rod 1, 1a or 1b has a second linking portion 12, 12a or 12b for engaging with the second connecting portion 20 of the positioning frame 2. The second connecting portion 20 and the second linking portion 12, 12a or 12b are combined by insertion, buckle engagement, embedding, embracing, rotational connection, pivotal connection, suction, magnetism, screwing connection, velcro tapes, adhesive or being formed integratedly.

The positioning frame 2 comprises a base 21, an immovable bracket 22 deposited at one side of the base 21, and a movable bracket 23 movably deposited at an opposite side of the base 21. The movable bracket 23 is movably provided on the base 21 by slide, pull or rotation of a guide system 24, a rail system, a tooth-notch engagement system or a gear system. The movable bracket 23 and the immovable bracket 22 are first adjusted to fittingly receive the mobile device 9 and then the movable bracket 23 is driven by an embracing means, a screw means, an adhesive means, a hydraulic means, a surface-tension means, a pressuring means, a pulling spring 25, a suction means or a torque means to move toward the immovable bracket 22, so as to hold the mobile device 9 firmly between the movable bracket 23 and the immovable bracket 22 regardless of how the mobile device 9 is sized.

The base 21 of the positioning frame 2 has its inner side, where the mobile device 9 contacts, provided with a cushion 43, so as to enhance the anti-slip effect of the positioning frame 2 on the surface of the mobile device 9.

While the movable bracket 23 of the positioning frame 2 is configured to move at one side of the base 21 for adjusting the capacity of the positioning frame 2, the positioning frame 2 can pivot on the second connecting portion 20 to rotate with respect to the extension rod 1, 1a or 1b up to 90 degrees.

The inner surface of the base 21 or the cushion 43 of the positioning frame 2 is provided with at least one sucking disc 26 for holding the mobile device 9, thereby ensuring close connection between the positioning frame 2 and the mobile device 9 to make the mobile device 9 get secured firmly. The sucking disc 26 may be provided on the base 21 or the cushion 43 by forming integratedly, adhering, embedding or inserting.

Figure 11:
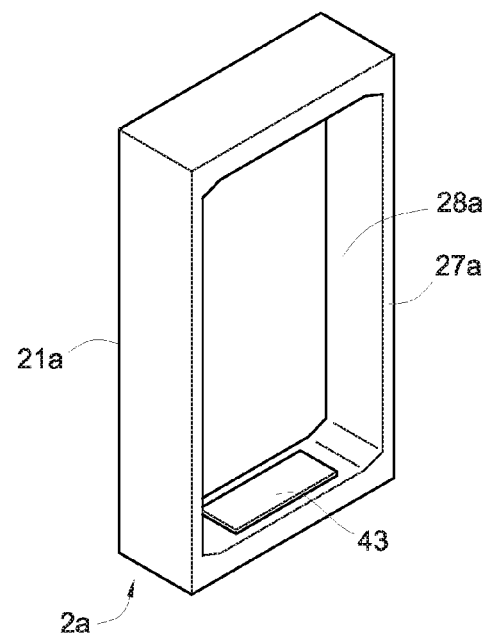
FIG. 11 is a perspective view of an additional mode of the positioning frame of the present invention.
Figure 12:
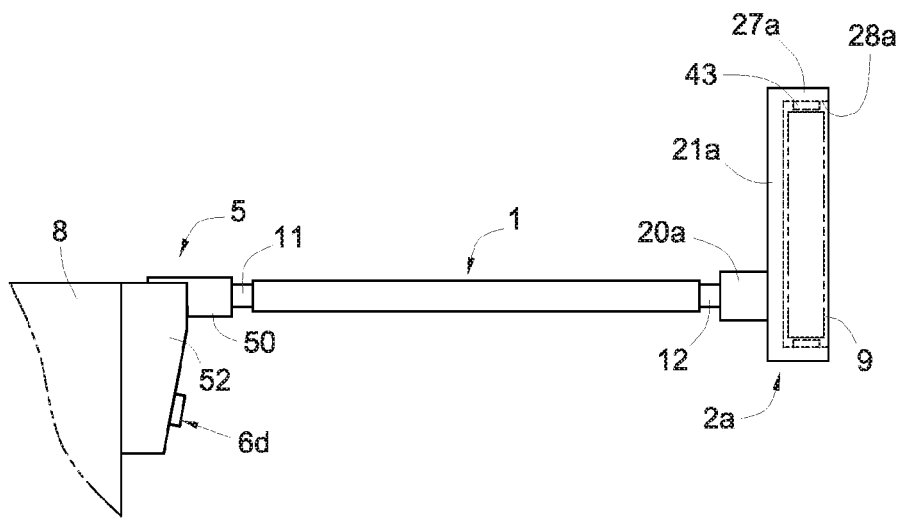
FIG. 12 is a front view of a second embodiment of the present invention.

Alternatively, as illustrated in FIG. 11 and FIG. 12, the positioning frame 2a may be an extendable jacket. The jacket has a base 21a and an elastic enclosure 27a circling the base 21a. A positioning recess 28a is defined between the base 21a and the inner wall of the enclosure 27a, for fittingly receiving the mobile device 9. In addition, the base 21a of the positioning frame 2a has a second connecting portion 20a at its back, for engaging with the second linking portion 12 of the extension rod 1.

The positioning frame 2a, at its surface contacting the mobile device 9, is covered by a cushion 43, so as to enhance the anti-slip effect of the positioning frame 2a on the surface of the mobile device 9. The positioning frame 2 is freely adjustable in width so as to rapidly holding the mobile device 9 which may be of any commercially available size, and the positioning frame 2 is rotatable to change the viewing angle of the mobile device 9 received therein.

Thereby, the fixer is highly portable and can be quickly and conveniently attached to a horizontal handrail 71 or a vertical handrail 72 a public transportation vehicle by means of the securing member 3, 3a, 3b or 3c. Then the fixer can hold a mobile device 9, such as a mobile phone, a portable game player, an electronic book, a GPS device or a tablet computer, in the positioning frame 2. Thus, a user can use his/her mobile device 9 in any public transportation vehicle during either a long distance trip or a short distance trip without the need of holding the mobile device 9 with his/her hand. To sum up, the disclosed fixer is highly portable and can be quickly and conveniently mounted on and dismounted from handrail 71 and 72, thereby being helpful to prevent users' muscle fatigue and ache caused by overuse of neck and shoulder muscles.

Figure 13:
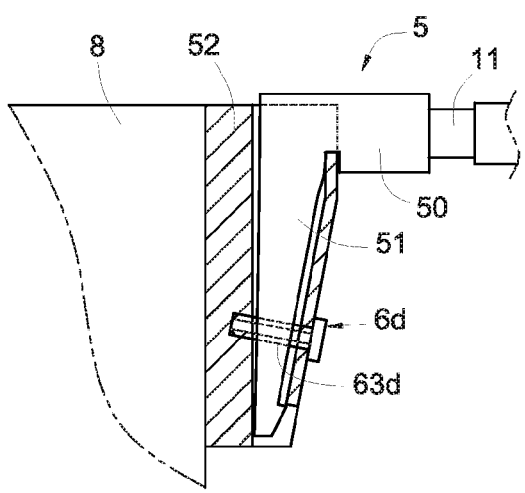
FIG. 13 is a partially enlarged cross-sectional view of FIG. 12.

FIG. 12 and FIG. 13 disclose a second embodiment of the present invention which is different from the first embodiment for the following features.

A securing member 5 has one end provided with a connecting tongue 51 and has a connecting socket 52 that is configured to disassembly assemble with the connecting tongue 51 and be fixed to the external article 8. The securing member 5 is assembled to the connecting socket 52 on the external article 8 through the connecting tongue 51. The locking unit 6d includes a threaded bolt 63d screwedly connected between the connecting tongue 51 and the connecting socket 52. The connecting socket 52 is fixed to the external article 8 by, a screw means, a close-fitting means, a buckle means or an adhesive means.

The external article 8 may be a backpack, a hat, a safety helmet, a shoulder strap, a sling, a tie, a brief case, a luggage case, a mask, a helmet, a handle, a wall, a table or a chair. The securing member 5 is combined with the connecting socket 52 on the external article 8 through the connecting tongue 51.

The connecting socket 52 may be formed as a fixing member on any portable article so it can be easily mounted on a user's shoulder, neck or head, or on the user's backpack, a hat or a sling and carried by the user. The connecting socket 52 in this case is made according to a general specification so it can be combined with the extension rod 1.

The connecting tongue 51, at it's the other end, has a first connecting portion 50. The first linking portion 11 of the extension rod 1 is configured to engage with the first connecting portion 50 of the connecting tongue 51. The first connecting portion 50 and the first linking portion 11 are combined by insertion, buckle engagement, embedding, embracing, rotational connection, pivotal connection, suction, magnetism, screwing connection, velcro tapes, adhesive or being formed integratedly. The rest of the second embodiment is similar to the first embodiment in terms of structure and operation.

Figure 14:
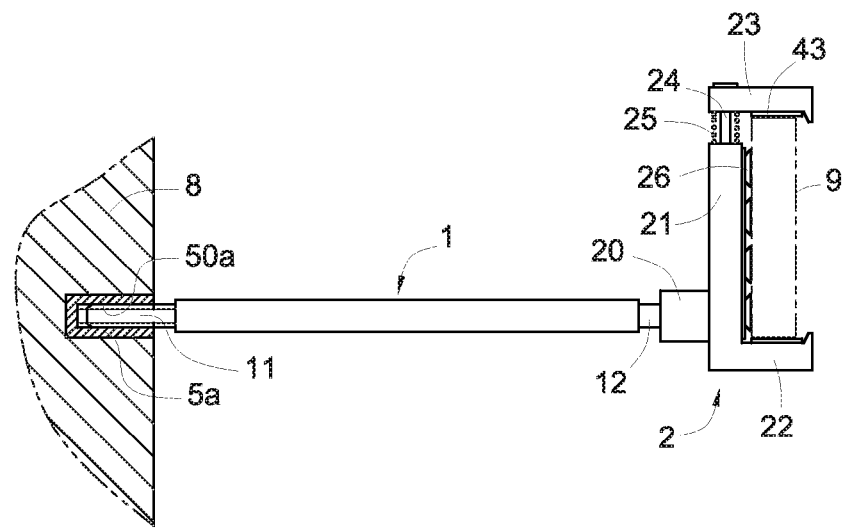
FIG. 14 is a front view of a third embodiment of the present invention.

FIG. 14 discloses a third embodiment of the present invention, which is different from the first embodiment for the following features.

A securing member 5a is formed on the external article 8 and has a first connecting portion 50a, while the end of the extension rod 1 has a first linking portion 11 for engaging with the first connecting portion 50a of the securing member 5a. The locking unit may be the first connecting portion 50a, and the first connecting portion 50a may be a threaded hole, while the first linking portion 11 may be a threaded rod. The first connecting portion 50a and the first linking portion 11 are combined by insertion, buckle engagement, embedding, embracing, rotational connection, pivotal connection, suction, magnetism, screwing connection, velcro tapes, adhesive or being formed integratedly.

Alternatively, the securing member 5a may be realized as apart of the external article 8, and the first connecting portion 50a in the form of a threaded hole is directly formed on the external article 8.

Figure 15:
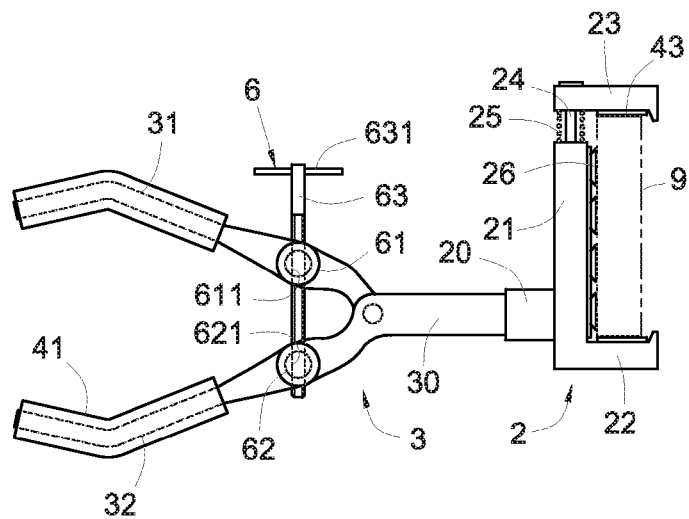
FIG. 15 is a front view of a fourth embodiment of the present invention.

FIG. 15 discloses a fourth embodiment of the present invention, thereby illustrating the fixer for handheld, portable, mobile devices according to the present invention. The fixer comprises:

a positioning frame 2, for holding and positioning an external mobile device 9;

a securing member 3, deposited at the back of the positioning frame 2, for attaching and securing the positioning frame 2 onto an external article, so as to suspend the mobile device 9, wherein the external article is a planar or bar-like article; and a locking unit 6, deposited on the securing member 3, for fixing the securing member 3 to the external article.

The securing member 3 is configured to grasp a horizontal or vertical, planar or bar-like article, so that when a user touches and operates the mobile device 9, the mobile device 9 is strongly positioned over the external article by the locking unit 6 and prevented from swinging or displacing.

The securing member 3 has a first connecting portion 30. The back of the positioning frame 2 is provided with a second connecting portion 20 that is configured to engage with the first connecting portion 30 of the securing member 3. The first connecting portion 30 and the second connecting portion 20 are combined by insertion, buckle engagement, embedding, embracing, rotational connection, pivotal connection, suction, magnetism, screwing connection, velcro tapes, adhesive or being formed integratedly.

What is claimed is:

1. A fixer for handheld, portable, mobile devices, the fixer comprising:

an extension rod;

a positioning frame, deposited at one end of the extension rod, for holding and positing an external mobile device;

a securing member, deposited at an opposite end of the extension rod, for attaching and securing the extension rod and the positioning frame onto an external article, so as to suspend the mobile device, wherein the external article is a planar or a bar-like article; and a locking unit, deposited on the securing member, for fixing the securing member to the external article;

wherein the extension rod is rigid in a vertical direction or in a horizontal direction, and the securing member is configured to grasp a horizontal or vertical, planar or bar-like article, so that when a user touches and operates the mobile device, the mobile device is strongly positioned over the external article by the extension rod and the locking unit, and is prevented from swinging and displacing;

wherein the securing member comprises two movable symmetrical clamping jaws, and the locking unit has a threaded bolt screwedly connecting the clamping jaws at end portions of the clamping jaws adjacent to the opposite end of the extension rod; the locking unit comprising one pivot for each said clamping jaw, each said pivot being formed with a threaded hole, and the threaded bolt being screwedly passing through the threaded holes of the pivots of the clamping jaws, the threaded bolt having one end provided with an adjusting lever for being operated to drive the threaded bolt, so as to adjust an included angle between the clamping jaws unilaterally and to form an opening between other end portions of the clamping jaws thereby allowing the clamping jaws to hold or release the external article from the opening; the positioning frame including a base, an immovable bracket deposited at one side of the base, and a movable bracket movably provided at an opposite side of the base; the movable bracket being movably provided at the opposite side of the base by pull of a guide system provided with a pulling spring, wherein the movable bracket is driven by the pulling spring to move toward the immovable bracket, so as to hold the mobile device fittingly and firmly between the movable bracket and the immovable bracket regardless of how the mobile device is sized; a surface of the positioning frame for contacting the mobile device being covered by a cushion for helping the positioning frame to engage with a surface of the mobile device; and the base or the cushion of the positioning frame being provided with at least one sucking disc for holding the mobile device, thereby ensuring close connection between the positioning frame and the mobile device.

2. The fixer of claim 1, wherein the positioning frame has a second connecting portion, and the extension rod has the end provided with a second linking portion that is configured to engage with the second connecting portion of the positioning frame.

3. The fixer of claim 1, wherein the securing member has a first connecting portion, and the extension rod has the opposite end provided with a first linking portion that is configured to engage with the first connecting portion of the securing member.

4. The fixer of claim 1, wherein the securing member is deposited on the external article and has a first connecting portion, while the extension rod has the opposite end provided with a first linking portion that is configured to engage with the first connecting portion of the securing member, in which the locking unit is the first connecting portion, and the first connecting portion is a threaded hole.

5. The fixer of claim 1, wherein the clamping jaw is covered by a cushion for helping enhancing close connection and friction between the clamping jaw and the external article.

* * * * *